United States Patent [19]

Andoe

[11] Patent Number: 5,035,759
[45] Date of Patent: * Jul. 30, 1991

[54] METHOD OF PROTECTING HULLS OF MARINE VESSELS FROM FOULING

[75] Inventor: Graham C. Andoe, Fort Lauderdale, Fla.

[73] Assignee: Andoe, Inc., Atlanta, Ga.

[*] Notice: The portion of the term of this patent subsequent to Sep. 20, 2005 has been disclaimed.

[21] Appl. No.: 409,071

[22] Filed: Sep. 19, 1989

[51] Int. Cl.⁵ .................. B29C 53/04; G01B 3/12; G01B 5/20
[52] U.S. Cl. .................. 156/64; 156/71; 156/212; 156/281; 156/360; 114/67 R; 114/222; 114/356; 114/361; 422/6; 422/8; 428/907
[58] Field of Search .................. 114/356, 361, 67 R, 114/222; 422/6, 8; 428/457, 693, 907; 156/281, 64, 71, 196, 212, 250, 256, 353, 360, 378, 379; 204/147, 148, 197

[56] References Cited

U.S. PATENT DOCUMENTS

| | | | |
|---|---|---|---|
| 3,193,424 | 7/1965 | Scott | 156/153 |
| 4,405,394 | 9/1983 | Cohen | 156/281 |
| 4,772,344 | 9/1988 | Andoe | 156/71 |
| 4,806,432 | 2/1989 | Eguchi et al. | 428/457 |
| 4,814,227 | 3/1989 | Maeda et al. | 428/907 |
| 4,908,275 | 3/1990 | Tsuji et al. | 428/457 |

*Primary Examiner*—Caleb Weston
*Assistant Examiner*—Mark A. Osele
*Attorney, Agent, or Firm*—H. Jay Spiegel

[57] ABSTRACT

The present invention relates to an improved method of protecting the hulls of marine vessels from fouling. The inventive method involves the application of thin metallic films to the hull of a boat. The inventive method includes the use of various techniques for application of the film, techniques for preventing the touching of dissimilar metals, techniques for insuring that dissimilar metals are insulated and isolated from one another, insuring that active or passive cathodic protection systems are not on the same surface plane as the attached films and other techniques. The specific materials which are applied to the vessel hull as well as their various parameters in the environment of the present invention are disclosed. Specific treatments to the thin metallic film to improve the adherence of these thin film hulls and adjacent films are disclosed. Furthermore, improved methods for insulating dissimilar metals from one another as well as improved materials for achieving and assuring insulation are included as part of the present invention.

24 Claims, 3 Drawing Sheets

METHOD OF PROTECTING HULLS OF MARINE VESSELS FROM FOULING

BACKGROUND OF THE INVENTION

Firstly, applicant wishes to incorporate by reference disclosure document no. 200,011 which was filed on Aug. 26, 1988 and a disclosure document entitled "PERMA HULL" which was led on Apr. 29, 1987, in the U.S. Patent and Trademark Office.

This patent application discloses inventions which constitute improvements over an invention disclosed in U.S. Pat. No. 4,772,344 to Andoe dated Sep. 20, 1988; the Andoe patent is hereby incorporated by reference.

Applicant's prior patent discloses a method of installing a copper material on the hull of a vessel such that no contact is permitted between the copper material and any and all dissimilar metals. Also disclosed therein is a new passive or active cathodic protection system which reduces the corrosion of the copper material that has been attached to the vessel. In conjunction with the attaching of the copper material to a hull of a vessel, a dielectric barrier is disclosed having dielectric characteristics that reduce the galvanic corrosion effects, the dielectric barrier being interposed between the copper material and dissimilar metals.

The prior patent also discloses uses of the improved dielectric barrier in areas of overlap as well as pretreatments of areas to be overlapped to enhance bonding between materials. The prior patent discloses, as advantages of the inventive method, extended vessel life by installing the improved copper material to a hull of a vessel, reduced hull damage and corrosion, improved bonding of the copper material onto a hull and improved economics regarding the installation method per se. The following areas of the aforementioned issued patent have been found to necessitate further research to find improved ways of installing the copper foil material and protecting the hull of a vessel:

(a) Bonding between the hull and the copper material as well as at overlap joints in certain commercial, marine vessel and pleasure boat applications has been difficult to achieve and maintain.

(b) Impacts to the hull of a vessel establishing galvanic couples between the hull and applied copper materials cannot be detected without visual observation.

(c) The dielectric barrier as disclosed in the prior patent does not account for the varying galvanic corrosion rates that occur for differing hull compositions and under water appendage compositions in conjunction with a particular composition of the applied copper material. Furthermore, methods of applying the dielectric barrier as well as different areas of application lack flexibility as to time constraints required to achieve successful bonding.

(e) Limitations exist involving being able to use the disclosed cathodic protection system in all areas where less than 30 inches in a plane separate the cathodic protection system from a portion of the hull of a vessel.

SUMMARY OF THE INVENTION

The present invention relates to an improved method of installing a copper strip material to the hull of a vessel. The present invention includes the following interrelated aspects and features:

(a) In a first aspect, the method of installing the copper material includes process steps to treat the copper material prior to its application to a hull of a vessel. These process steps have been found to provide improved bonding performance in various applications, including commercial and other large marine vessels. These process steps include cleaning the copper material prior to applying it to a hull. The cleaning steps may include either chemical cleaning techniques or mechanical methods. In conjunction with the cleaning step, a surface finish may be produced on the copper material including areas of overlap to further enhance bonding to the hull. The surface finish may be produced as a part of the cleaning step or subsequently thereto. One additional treatment to the copper material may include stress relief annealing prior to the cleaning step to improve flatness of the material, thereby improving the adherence of the material to a hull.

(b) Once the material has been cleaned as described hereinabove, the material should be protected from further contamination if the material is not going to be applied immediately to a hull. This protection may include priming the surface of the material with a material compatible with the copper alloy to be installed on the hull and having properties that will prevent oxidation or other types of contamination or degradation of the surface of the material. The primer material may include the improved dielectric barrier material to be described hereinbelow.

(c) An improved dielectric barrier material has been developed having a component therein to minimize galvanic corrosion effects associated with the copper material installed on a vessel. The components may be a copper powder wherein the volume of copper powder is selected depending on factors such as the type of hull material, the composition of the copper material to be applied to the vessel, expected water salinity and temperature, expected vessel speed and duty use. Also disclosed is an improved method of preparing the dielectric barrier for application as well as improved uses of on the vessel having the copper material applied thereto. A further improvement regarding the aforementioned dielectric barrier includes one of a surface-actuated type that may require the application of external heat to initiate the bonding process. This type of adhesive provides an improvement over prior types in that the applicator may have more control over the bonding process through control of the required heat necessary for application.

(d) As a further improvement in the method of installing the copper material, a zone alarm system may be incorporated with the copper material. This system may be installed as a plurality of zones corresponding to distinct areas of the copper material covered hull. With this zone alarm system, indicator means will alert the vessel operator when a galvanic couple between the hull and the copper material has been created by some object impacting on the copper material in a certain location such that the necessary repairs may be made and damage or corrosion to the vessel may be minimized.

(e) In pleasure boat applications, the improved method of installing the copper foil material includes providing a fine surface finish on the exterior surface of the material to minimize drag. The fine surface finish also requires a surface roughening step in areas of overlap of the copper material to assure proper bonding.

(f) In vessels having underwater appendages that are flush mounted to the copper material as installed on a hull, improved galvanic corrosion resistance results when the composition of these underwater appendages is matched to the composition of the copper material.

(g) As an additional improvement in installing the copper material of the present invention, thereby improving bonding performance on hulls of vessels, a cleaning step may be performed on the hull of the vessel to be coated prior to application of the copper material. This cleaning step removes contaminants from the hull surface thereby improving bonding between the hull and the copper material. If application of the copper material to the hull is not to be performed immediately, the hull should be concealed or primed with a material compatible with the copper material to be installed thereon. This primer material may be the dielectric barrier aforementioned.

Accordingly, it is a first object of the present invention to provide an improved method of installing a copper material on the hull of the vessel.

It is a further object of the present invention to treat the copper material prior to applying it to the hull of a vessel to improve the bonding performance.

It is a yet further object of the present invention to provide an improved dielectric barrier for use in installing the copper material to the hull of the vessel.

These and other objects aspects and features of the present invention will be better understood from the following detailed description of the preferred embodiments when read in conjunction with the appended drawing figures.

SPECIFIC DESCRIPTION OF THE PREFERRED EMBODIMENT

The present invention describes specific techniques and structures and compositions so as to overcome each and every one of the deficiencies in the prior art as set forth hereinabove in the background of the invention.

FIGS. 1 to 5 correspond to FIGS. 1 to 5 of the aforementioned Andoe patent, an explanation of which may be found herein below. In order to optimize the effects which are attained through the teachings of the Andoe patent and the present invention, several rules must be adhered to. Firstly, absolutely no contact is permitted between the copper-nickel anti-foulant metallic foil and any and all dissimilar metals on such structures as, for example, through-hull fittings, propeller struts, propeller shafts, rudders, pintles, gudgeons, bolts, nuts or washers. In the preferred embodiments of the Andoe patent and the present invention, it is desirable to maintain at least one-half inch clearance between the metallic foil and any and all dissimilar metals. Alternatively, these fittings may be made of a material which does not negatively interact with the foil.

Figure 1:
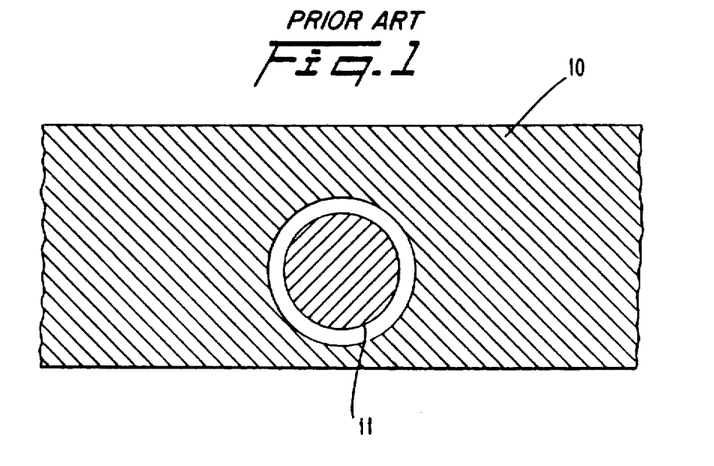
FIG. 1, taken from U.S. Pat. No. 4,772,344, shows a side view of a portion of a vessel hull incorporating the present invention thereon.

This is illustrated in FIG. 1. wherein the foil 10 is seen to be spaced circumferentially about a hull fitting 11 in such a manner that the dissimilar metals respectively comprising the foil and the fitting do not under any circumstances engage one another.

Figure 2:
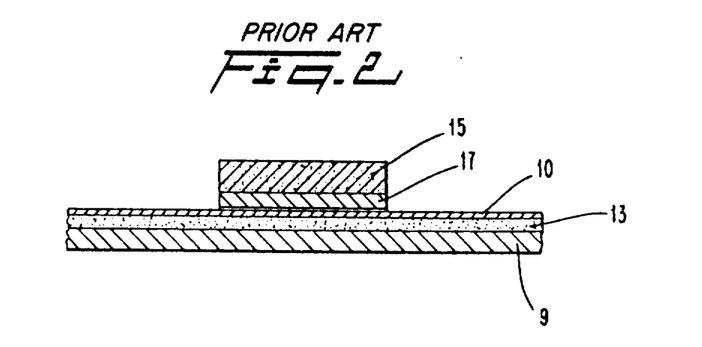
FIG. 2, taken from U.S. Pat. No. 4,772,344, shows a cross-sectional view through a portion of the hull of a vessel illustrating another aspect of the present invention.
Figure 3:
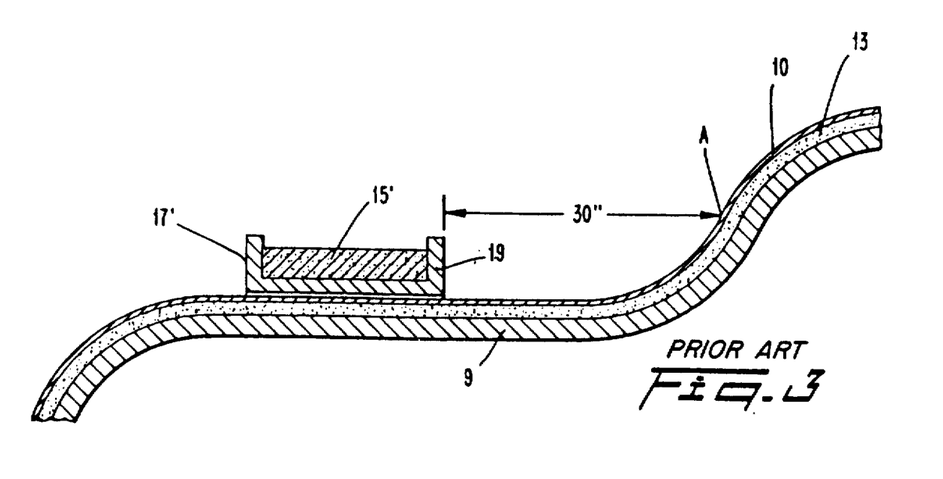
FIG. 3, taken from U.S. Pat. No. 4,772,344, shows a further cross-sectional view through another portion of the hull of a vessel and showing another aspect of the present invention.

In a further aspect of the Andoe patent, a new active or passive cathodic protection anode system is provided. The anode materials in the passive cathodic protection system may be made of any one of magnesium, aluminum, zinc, chromium, iron, cadmium or nickel. The materials must be attached to the hull so that they do not touch the metallic foil. Further, these components must be isolated from the metallic foil in such a manner that they do not lie on the same plane thereof. This maybe accomplished through the use of an insulating mounting disc, block, plate, holder or other inert device. In this regard, FIG. 2 shows the hull 9 with the foil 10 adhered thereto through the use of an adhesive layer 13. The cathodic protection system 15, as shown in FIG. 2, comprises inzinc which is separated from the foil 10 by virtue of an insulative layer 17. Further, as best sen in FIG. 3, the cathodic protection system must be shielded in such a manner that any curved underwater surface which is coated or sheathed with the metallic foil is at least 30 inches away from the cathodic protection system component in the same plane thereof. With reference to FIG. 3, the hull 9 is seen to have a metallic foil 10 thereon attached by virtue of an adhesive layer 13. Inzinc 15' is mounted thereon by virtue of an insulative container 17' having walls 19 which isolate the inzinc 15' from the surface A of the foil 10 which as seen in FIG. 3 might lie in the same plane as portions of the inzinc 15'.

Figure 4:
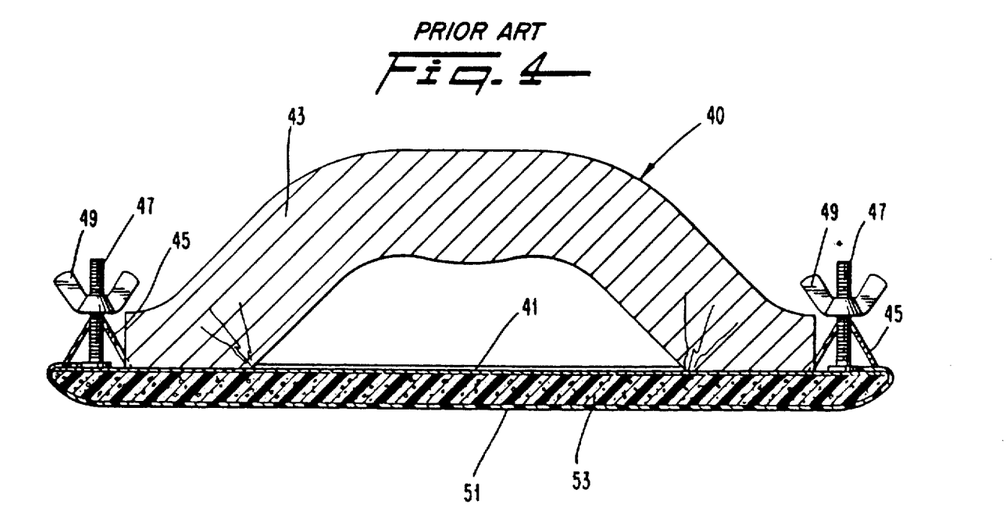
FIG. 4, taken from U.S. Pat. No. 4,772,344, shows a crosssectional view through a tool which has been developed by applicant to apply the foil to a vessel hull.

With reference now to FIG. 4, a tool has been disclosed in the Andoe patent which is quite useful in applying the foil to the hull of a vessel. With reference to FIG. 4, it is seen that the tool 40 includes a base plate 41, a handle 43 fastened thereto and mounting brackets 45 releasably engaging the plate 41 through the use of bolts 47 having removable wing nuts 49 threadably received thereon.

The brackets 45 have clamped therebeneath the ends of a smooth strip 51 of material, preferably nylon, under which is placed a strip 53 of flexible foam material. The foam material 53 is provided so that when the nylon strip 51 is engaged with the foil material, any irregularities caused by either the foil or the hull are not damaged by the device 40 due to the inherent give of the foam material 53. After the foil has been smoothed through the use of the device 40, a roller such as that which is used in wallpapering operations may be utilized to finalize the installation including the removal of bubbles and the pressing of the adhesive tightly between the hull and foil.

Figure 5:
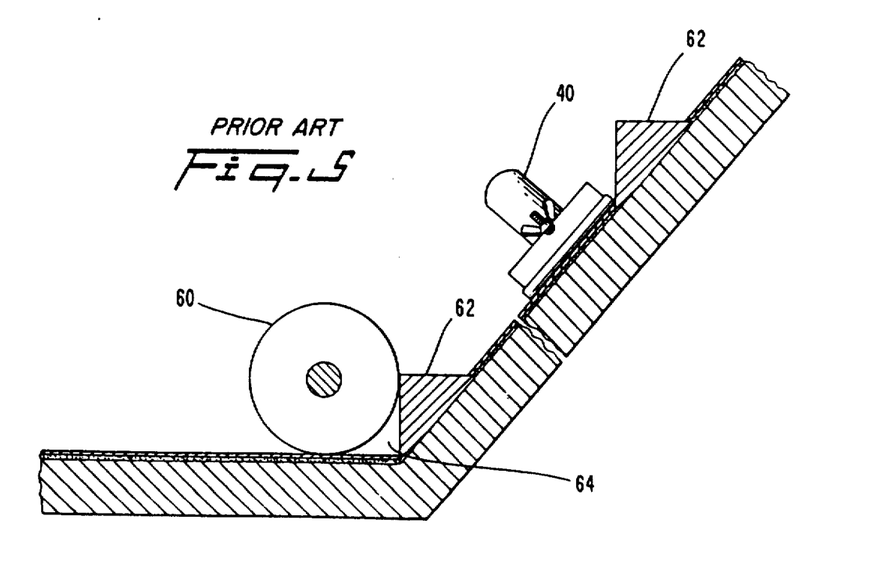
FIG. 5, taken from U.S. Pat. No. 4,772,344, shows a crosssectional view through a portion of a vessel hull illustrating tools used in applying foil thereto.

To apply pressure in square corners, a square edge as shown is necessary; for radiused corners a corresponding radiused edge is necessary. The application tool surface must be smooth, nonstick in nature and renewable in the event of damage. The above described strip 51 fulfills these objectives. As shown in FIG. 5, since the roller 60 does not meet the above requirements, it has been found to be of very limited value. In the way of hull strakes 62, the roller 60 will not touch corner areas 64 and thus, the square edged tool 40 is essential.

In one aspect of the present invention, it is contemplated to apply a copper-nickle anti-foulant metallic foil to the hull of a vessel using techniques to be described in greater detail hereinafter and through the use, in most cases, of an adhesive layer between the foil and the hull. If desired, the adhesive layer may be attached to the underside of the foil and may be protected, initially, by a release layer, or, if desired, the adhesive may be painted onto the hull and thereafter, the foil may be applied thereto.

The adhesive must be compatible with properly prepared copper/nickel surfaces so that it will adhere to the surfaces and will remain attached and waterproof while the surfaces are underwater, in motion at speeds up to 100 knots, while simultaneously functioning as a waterproof edge sealant and an anti-foulant. Applicant has developed a waterproof edge sealant suitable for use in the inventive method that is an anti-foulant, and an adhesive of this or similar nature must be used on all copper/nickel foil edges on marine vessels, stationary or mobile.

This preferred edge sealant is comprised of either powdered, milled, chipped or ground copper, copper/nickel or cuprous oxide in approximately 100 micron size particles, mixed into the adhesive so that the resultant edge sealant has, as a component thereof, the encapsulated particles of anti-foulant materials. The adhesive itself preferably is of a catalyzed nature such as vinylesters, epoxies, silicone, polysulfides or any other adhesive that is waterproof and will remain in bond to copper/nickel surfaces underwater and in motion.

Applicant has found that by matching the copper content of the sealant with the copper content of the copper alloy foil material, improved performance with respect to anti-fouling properties and prevention of galvanic corrosion is achieved. The volume of copper material to be added to the sealant may vary to up to about 70% copper depending on the particular application, for example, type of hull, duty use, water temperature and salinity and vessel speed. For applications to aluminum hulls, the sealant may include up to 12% copper, for lead keels up to 10% copper, for steel hulls up to 25% copper, and for fiberglass, wood or other non-metallic hulls up to 40% copper.

The sealant may be made by combining a dielectric material, for example silica with an amount of a resin and a copper material, preferably copper powder. In a preferred method, all three of these components are mixed together and then combined with a catalyst, the amount of catalyst being adjusted by volume depending on application temperature. A typical mixture without the catalyst may comprise 14 ounces of silica, one gallon of resin and 69% by volume of copper powder, nominally −325 mesh. For different insulating effects, the silica amount may be increased with a corresponding decrease in copper powder content. The resin and catalyst types may be any known type that are used in the art of catalyzed adhesives.

The mixture may then be applied in a plurality of coats to the hulls of vessels using a solvent such that each coating is approximately 0.010 inches.

Another preferred method of making and applying the dielectric barrier on the surface of a hull may include the following steps:

(1) The hull is cleaned to remove dirt and contaminants by sand blasting;

(2) The hull surface is primed with any known primer material for use on vessel hulls;

(3) Solvents such as ethyl cellusolve and N-butanol may be mixed in equal proportions;

(4) An epoxy resin is added to the solvent mix in a ratio of 0.67:1, resin to solvent;

(5) A catalyst having a predetermined volume of copper powder already mixed therein is blended with the aforementioned solvent mixture in a ratio of 1:1.67, catalyst to resin-solvent mixture;

(6) The copper powder volume is determined such that the final volume of dielectric barrier will have up to 70% copper powder by volume as described hereinabove;

(7) The entire mixture may then be brushed or sprayed onto the hull of a vessel to a thickness of approximately 0.008 inches;

(8) After 4 to 8 hours a second coat may be applied producing a final thickness of about 0.015 inches. The first coat should be slightly firm and lightly tacky when the second coat is applied. If the first coat is too dry or firm, a light sanding may be done to roughen the surface. An inspection of the coatings should occur 48 to 72 hours after the second coat has been applied.

In order to minimize galvanic corrosion effects when installing the foil material of the present invention the sealant may be utilized in a variety of applications. Firstly, any seams where the copper strip materials are joined should be sealed with the aforementioned sealant. Secondly, in configurations where cathodic protection systems are utilized to minimize galvanic corrosion in areas where less than 30 inches, in a horizontal plane, separate hull sections, the sealant may be used on the edges of the cathodic protection system to minimize galvanic currents. Thirdly, any underwater fittings which may be electrically connected to minimize galvanic currents should be sealed prior to the electrical connection. Fourthly, the outermost edges of the copper strip material, usually at or above the water line should also be sealed using the above-mentioned sealant. Fifthly, areas that have been primed should also be completely coated with a dielectric barrier prior to applying the copper material to the primed surface. Lastly, in large marine vessels it may be impossible to apply the copper strip material to the hull at one time because of the presence of chocks or other supporting devices in contact with the hull. In this case, copper strip materials may have to be applied wherein raw edges of the material may be exposed. Applicant has found that in the areas where the supports exist, the copper strip material should be applied such that the water flow will not bear against the raw edges of the material and the adhesive at these raw edges should be tapered in the same direction as intended water flow.

The thickness of the adhesive between the hull and the copper material may vary depending on the type of hull as well as the bonding strength requirements and the thickness of copper foil material. In continuous commercial applications the thickness of adhesive should be maintained between about 0.015 to 0.025 inches. The adhesive may be applied in any known manner but a roller coating means having an adjustable dispensing feature is preferred to maintain the correct resin to catalyst ratio.

In a further embodiment of the sealant of the improved method, a surface actuated adhesive may be the aforementioned catalyzed dielectric adhesive, i.e., having similar dielectric properties, but requires an additional step to initiate the bonding process. Applicant has successfully utilized an adhesive containing a modified coal tar bitumen that has the requisite dielectric characteristics to act as an insulating medium. Using this high viscosity product requires the application of heat to initiate the bonding process. Typically, the adhesive must be at 30° C. for the bonding process to work. At 30° C., an approximate 30 day cure time is required to complete the bonding process, with a corresponding lower cure time with additional heat application. At temperatures of 21° C. the application of external heat is necessary to complete bonding of the surface actuated adhesive.

In a further aspect of the invention, it has been discovered that in commercial applications where large and thick sections of copper-nickel sheathing are used, proper bonding of these sections to a hull is difficult to achieve and maintain. One source of this difficulty besides the presence of the contaminants described hereinabove is oxidation products formed on the surface of a copper nickel sheathing. Formation of the oxidation products is enhanced by the exposure of the sheathing to marine salt air prior to bonding to a hull. As a solution to the problem of bonding the sheathing to the hull of the vessel, the copper nickel material may be subjected to a cleaning step prior to the bonding step. This cleaning step may include subjecting copper nickel sheathing to an acid wash by immersion or spraying techniques, the acid being of a known type that will remove oxidation products from copper alloy strips. Alternatively, a mechanical cleaning or abrading step may be employed utilizing techniques such as shot blasting, shot peening, brushing or sanding. A preferred device for cleaning the surface of the copper strip materials includes a descaling machine commonly referred to as a PANGBORN descaler in the field of cleaning of metallic strip materials.

As an adjunct to improved bonding applications, applicant has discovered that etching or producing a particular surface finish on the copper alloy strip material prior to application to a hull enhances the bonding between the copper alloy strip and the hulls of vessels. This surface finish can be achieved through the mechanical cleaning step aforementioned to obtain a preferred surface finish of between about 20 grit to 400 grit. The particular surface finish needed to achieve enhanced bonding may depend upon such variables as copper alloy strip thickness, bonding adhesive thickness, bonding strength requirements, etc. It has been found that in applications where the thickness of the adhesive between the copper alloy strip and hull is small, a finer surface finish on the copper alloy strip will be sufficient to achieve the requisite bonding strength, with the thicker adhesive applications requiring a coarser surface finish on the copper alloy material. Without this mechanical abrading of the surface, it has been found that in aluminum hull applications the bond strength of the dielectric adhesive is approximately 500 pounds per square inch resulting in premature failures. However, in aluminum hull applications using the inventive mechanical abrading step, bond strengths are approximately 2800 pounds per square inch, roughly an increase of five times. Using this mechanical abrading step, bonding failures have been attributed to the adhesive itself rather than the adhesive-copper strip material interface.

In another embodiment, the copper alloy strip may be first cleaned using an acid wash as described hereinabove followed by a subsequent mechanical abrasing step to produce the desired surface finish.

Once a cleaning step or cleaning and abrading steps have been performed to the copper alloy strip and the copper alloy strip is not scheduled to be applied to the hull within 20 minutes, the surface of the strip material must be sealed or primed to protect it from further contamination due to unwanted oils, dirt or oxidation products.

This sealing or priming step may be performed using any known primer material commonly employed to prevent oxidation of copper alloy materials and materials that are compatible with the copper alloy material. As a preferred primer, the improved dielectric barrier described hereinabove may be utilized as the priming material. The thickness of the primer material may vary depending on the thickness of the copper alloy strip but a preferred thickness ranges between 0.001 to 0.002 inches.

Another problem associated with commercial application of the copper material is that the sections of material are not flat prior to applying them to the hull of the vessel. This unevenness in the strip material is a result of residual rolling stresses remaining in the material after the last rolling operation. These internal stresses result in the strips of copper material exhibiting curving in both longitudinal and transverse directions. These curves cause difficulty in proper adhesion of the copper strip material to a hull. To solve this problem, applicant has discovered that stress relief annealing the copper strip material prior to applying it on a hull reduces the internal stresses in the material and produces a flatter product that has improved adhesion to the hull. This stress relief annealing step is conducted using parameters well known in the field of stress relief annealing of strip material and exact operating parameters are not considered an aspect of the present invention. Once the material has been stress relieved, it may be subjected to the above-described cleaning and/or abrading and priming steps prior to application onto the hull of a vessel.

In addition to providing a clean copper strip material surface, applications wherein a vessel hull has been in a marine environment may require a cleaning step prior to applying a copper strip material. This hull cleaning step may be performed using mechanical or chemical means. After the cleaning step, the hull surface should be protected to prevent oxidation or accumulation of dirt if the copper strip material is not to be applied within 20 minutes. The hull may be protected by applying a spray-on primer that is compatible with the dielectric barrier to be used to adhere the hull to the copper strip material or the dielectric barrier itself may be used as a primer.

Figure 6:
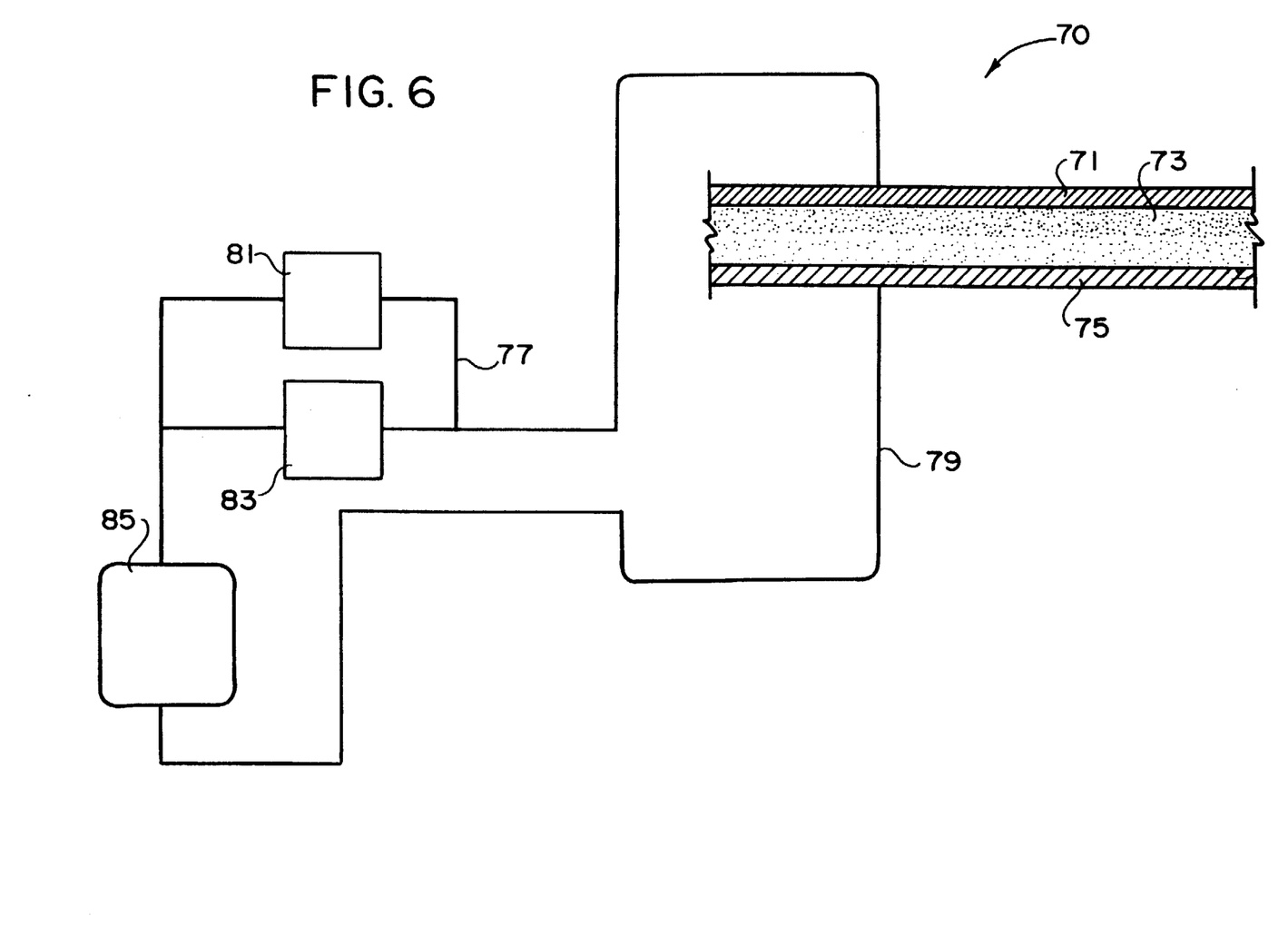
FIG. 6 shows a schematic representation of the zone alarm system of the present invention.

In a further aspect of the invention, the method of installing the copper material to the hull of the vessel may include a zone alarm system which is designed to indicate when and where a galvanic couple may have been created between the copper material and hull. In the operation of boats, the hull may be subjected to various impacts that may dent or crease the outer copper material such that the dielectric barrier no longer separates the copper material from a dissimilar metal hull material. As such, utilizing the novel alarm system as described hereinafter will facilitate indicating to the boat operator that a galvanic couple has been established by impact between the hull and the copper strip material. FIG. 6 illustrates a typical schematic of a zone alarm system generally designated by reference numeral 70 and is seen to include a first leg of the electrical circuit 77 connected to copper strip material 71, a second leg of the electrical circuit 79 connected to the vessel hull 75, horn and light indicators 81 and 83 respectively connected in parallel to circuit leg 77, power source 85 connected between the horn and light indicator 81 and 83 and circuit leg 79. Vessel hull 75 is separated with a dielectric barrier 73 from copper material 71. In operation, the circuit remains open until impact on copper material 71 causes the copper material 71 to bend or dent such that vessel hull 75 is in contact with copper material 71. This contact results in electrical conduction thereby closing the circuit and actuating horn 81 and light 83 thereby indicating to the user of the vessel that a galvanic couple has been created and notifying the user to repair the damaged area of the hull. Although the illustrated alarm system depicts a light and horn in combination, either indicator may be utilized alone. Additionally, a plurality of these alarm systems may be used to create a zoned system such that the user of the vessel may identify more easily which area the hull has the galvanic coupling.

In another aspect of the invention, applicant has discovered that improved results occur in pleasure boat applications when the copper strip material has an outer surface finish of between about 15 to 25 microns. This surface finish assists in minimizing drag during vessel operation. When applying the copper strip material having the above-mentioned surface finish, it has been discovered that in areas of overlap the portion of the fine surface finished strip material that is to be overlapped by an adjacent strip requires an operation to roughen the portion of the surface to be overlapped to enhance the bonding between overlapping strips. This may be accomplished by a mechanical abrading step similar to the abrading step described hereinabove for bonding of the strip material to a vessel hull.

In another aspect of the invention, applicant has realized that a further reduction in galvanic corrosion may be achieved if all flush mounted underwater appendages of the vessel are approximately matched in composition to the composition of the copper strip material. Generally, these flush mounted appendages will be in direct contact with the copper strip material thereby necessitating a similarity in composition to reduce galvanic corrosion.

In a further aspect of the invention, an improved method is disclosed for applying the copper strip to the hull of a vessel without the necessity of mechanically or electrically sensing the profile of a hull and using the sensed profile to produce patterns of copper material. In this method, a simulative material in place of the copper strip material is utilized to determine the hull profile and produce the desired pattern for the copper strip material. This simulative material may be any material that has similar surface rigidity as well as thickness of the copper material to be applied. A preferred material would include a MYLAR type material. In this method, the measuring of the surface configuration of a hull is performed using the simulative material. In this measuring step, the simulative material is applied to the hull and is trimmed to produce patterns that accurately and completely cover the hull. Once the patterns are completed, the copper material may be cut using the patterns as a guide. After cutting, the copper strips may be applied as described hereinabove. The advantage this method offers includes eliminating the need of expensive equipment to perform the sensing step, reducing the amount of overlap, if any, which has significant economic advantages in large commercial applications and allowing the person performing the measuring step to custom design the patterns regarding which edges face aft, how edges are angled and how strakes and other appendages are covered.

Applicant has found that application of the foil to the boat hull in the improved manner described hereinabove results in the following advantages over that disclosed by the prior art:

1) Improved bonding between the copper material and hulls;
2) Improved economics by minimizing the amount of overlap during installation;
3) Less corrosion occurs between foil and hull;
4) More operator control during the installation process using the surface actuated adhesive.
5) Impact damage to the hull is readily detected.

Accordingly, an invention has been disclosed herein which overcomes each and every one of the deficiencies in the prior art as discussed hereinabove and which provides a new and improved method of installing a metallic foil on a vessel hull which is greatly reduced in cost and greatly increased in life. Various changes, modifications and alterations may be contemplated by those skilled in the art to the teachings of the present invention, and such modifications, changes and alterations are intended to be construed as being included in the teachings of the present invention. Accordingly, it is intended that the present invention only be limited by the terms of the appended claims.

I claim:

1. A method of protecting a hull of a marine vessel from fouling, including the steps of:
   (a) measuring the surface configuration and shape of the hull;
   (b) providing a predominantly copper foil material having a first and second surface;
   (c) stress relief annealing said foil material to relieve internal rolling stress and improve adherence of said foil material to said hull;
   (d) cutting a plurality of strips of said predominantly copper foil material which together, taking into account intended strip overlap, correspond to said surface configuration, said hull including at least one structure thereon made of a metal of dissimilar composition from the composition of said foil material;
   (e) applying said strips of foil material to said hull in adjacent relation, in any, while maintaining isolation of said foil material from said at least one structure by physically spacing said foil material from said at least one structure so that currents are not conducted therebetween;
   (f) smoothing said strips of foil material on said hull with a smoothing device; and
   (g) rolling a roller device over said strips of foil to adhere said strips of foil to said hull and to eliminate bubbles therefrom.

2. The method of claim 1, wherein said measuring step is accomplished by running a computer mouse over said hull at spaced intervals at an angle to the keel of said vessel and recording, in said computer, data indicative of said surface configuration and shape.

3. The method of claim 2, wherein said cutting step is carried out by inputting data into a computer controlled cutting machine from said first mentioned computer and said cutting machine cutting said strips.

4. The method of claim 1, wherein said foil material includes about 15% nickel.

5. The method of claim 1, before said applying step, further including the step of cleaning at least said first surface of said foil material to remove oxidation products thereon and to improve adherence of said first surface of said foil material to said hull.

6. The method of claim 5, wherein said cleaning step comprises mechanically abrading said first surface.

7. The method of claim 5, wherein said cleaning step comprises subjecting said foil material to an acid bath to remove said oxidation products.

8. The method of claim 6, wherein said mechanical abrading introduces a surface finish on said first surface of about 20 to 400 grit.

9. The method of claim 6, including mechanically abrading said first surface to produce a surface finish of about 80 to 200 grit.

10. The method of claim 1, before said applying step, further including the step of priming said first surface using a primer material compatible with said foil material to protect said foil material from oxidation.

11. The method of claim 10, wherein said applying step includes the step of interposing a dielectric barrier between said first surface of said foil material and said hull, said dielectric barrier comprising an adhesive with dielectric properties which adheres said foil material to said hull.

12. The method of claim 11, wherein said primer material comprises said dielectric barrier.

13. The method of claim 11, wherein said applying step includes the step of applying said dielectric barrier on all seams of adjacent strips of said foil material.

14. The method of claim 6, further including the step of mechanically abrading a portion of a second surface of a respective said strip of said foil material that is to be overlapped by a portion of a first surface of an adjacent said strip of said foil material.

15. A method of protecting a hull of a marine vessel from fouling, including the steps of:
 (a) measuring the surface configuration and shape of the hull;
 (b) providing a predominantly copper foil material having a first and second surface;
 (c) cleaning said first surface of said foil material to remove oxidation products and improve adherence of said first surface of said foil material to said hull;
 (d) cutting a plurality of strips of said predominantly copper foil material which together, taking into account intended strip overlap, if any, correspond to said surface configuration, said hull including at least one structure thereon made of a metal of dissimilar composition from the composition of said foil material;
 (e) applying said strips of foil material to said hull in adjacent relation, if any, while maintaining isolation of said foil material from said at least one structure by physically spacing said foil material from said at least one structure so that currents are not conducted therebetween;
 (f) smoothing said strips of foil material on said hull with a smoothing device; and
 (g) rolling a roller device over said strips of foil to adhere said strips of foil to said hull and to eliminate bubbles therefrom.

16. The method of claim 15, wherein said cleaning step comprises mechanically abrading said first surface.

17. The method of claim 16, wherein said cleaning step comprises subjecting said foil material to an acid bath to remove said oxidation products.

18. The method of claim 16, wherein said mechanical abrading produces a surface finish on said first surface of about 20 to 400 grit.

19. The method of claim 16, including mechanically abrading said first surface to produce a surface finish of about 80 to 200 grit.

20. The method of claim 15 before said applying step, further including the step of priming said first surface after said cleaning step using a primer material compatible with said foil material to protect said foil material from oxidation.

21. The method of claim 20, wherein said applying step includes the step of interposing a dielectric barrier between said first surface of said foil material and said hull, said dielectric barrier comprising adhesive with dielectric properties which adheres said foil material to said hull.

22. The method of claim 21, wherein said primer material comprises said dielectric barrier.

23. The method of claim 21, wherein said applying step includes applying said dielectric barrier to all seams of adjacent said strips of foil material.

24. The method of claim 16, further including the step of mechanically abrading a portion of a second surface of a respective said strip of said foil material that is to be overlapped by a portion of a first surface of an adjacent said strip of said foil material.

* * * * *

UNITED STATES PATENT AND TRADEMARK OFFICE
CERTIFICATE OF CORRECTION

PATENT NO. : 5,035,759　　　　　　　　　　　　　　Page 1 of 4
DATED     : July 30, 1991
INVENTOR(S) : Graham C. Andoe It is certified that error appears in the above-indentified patent and that said Letters Patent is hereby corrected as shown below:

Columns 7 through 12, should be added as per attached sheets.

Signed and Sealed this

Nineteenth Day of October, 1993

Attest:

BRUCE LEHMAN

*Attesting Officer*　　　　*Commissioner of Patents and Trademarks* the aforementioned catalyzed dielectric adhesive, i.e., having similar dielectric properties, but requires an additional step to initiate the bonding process. Applicant has successfully utilized an adhesive containing a modified coal tar bitumen that has the requisite dielectric characteristics to act as an insulating medium. Using this high viscosity product requires the application of heat to initiate the bonding process. Typically, the adhesive must be at 30° C. for the bonding process to work. At 30° C., an approximate 30 day cure time is required to complete the bonding process, with a corresponding lower cure time with additional heat application. At temperatures of 21° C. the application of external heat is necessary to complete bonding of the surface actuated adhesive.

In a further aspect of the invention, it has been discovered that in commercial applications where large and thick sections of copper-nickel sheathing are used, proper bonding of these sections to a hull is difficult to achieve and maintain. One source of this difficulty besides the presence of the contaminants described hereinabove is oxidation products formed on the surface of a copper nickel sheathing. Formation of the oxidation products is enhanced by the exposure of the sheathing to marine salt air prior to bonding to a hull. As a solution to the problem of bonding the sheathing to the hull of the vessel, the copper nickel material may be subjected to a cleaning step prior to the bonding step. This cleaning step may include subjecting copper nickel sheathing to an acid wash by immersion or spraying techniques, the acid being of a known type that will remove oxidation products from copper alloy strips. Alternatively, a mechanical cleaning or abrading step may be employed utilizing techniques such as shot blasting, shot peening, brushing or sanding. A preferred device for cleaning the surface of the copper strip materials includes a descaling machine commonly referred to as a PANGBORN descaler in the field of cleaning of metallic strip materials.

As an adjunct to improved bonding applications, applicant has discovered that etching or producing a particular surface finish on the copper alloy strip material prior to application to a hull enhances the bonding between the copper alloy strip and the hulls of vessels. This surface finish can be achieved through the mechanical cleaning step aforementioned to obtain a preferred surface finish of between about 20 grit to 400 grit. The particular surface finish needed to achieve enhanced bonding may depend upon such variables as copper alloy strip thickness, bonding adhesive thickness, bonding strength requirements, etc. It has been found that in applications where the thickness of the adhesive between the copper alloy strip and hull is small, a finer surface finish on the copper alloy strip will be sufficient to achieve the requisite bonding strength, with the thicker adhesive applications requiring a coarser surface finish on the copper alloy material. Without this mechanical abrading of the surface, it has been found that in aluminum hull applications the bond strength of the dielectric adhesive is approximately 500 pounds per square inch resulting in premature failures. However, in aluminum hull applications using the inventive mechanical abrading step, bond strengths are approximately 2800 pounds per square inch, roughly an increase of five times. Using this mechanical abrading step, bonding failures have been attributed to the adhesive itself rather than the adhesive-copper strip material interface.

In another embodiment, the copper alloy strip may be first cleaned using an acid wash as described hereinabove followed by a subsequent mechanical abrasing step to produce the desired surface finish.

Once a cleaning step or cleaning and abrading steps have been performed to the copper alloy strip and the copper alloy strip is not scheduled to be applied to the hull within 20 minutes, the surface of the strip material must be sealed or primed to protect it from further contamination due to unwanted oils, dirt or oxidation products.

This sealing or priming step may be performed using any known primer material commonly employed to prevent oxidation of copper alloy materials and materials that are compatible with the copper alloy material. As a preferred primer, the improved dielectric barrier described hereinabove may be utilized as the priming material. The thickness of the primer material may vary depending on the thickness of the copper alloy strip but a preferred thickness ranges between 0.001 to 0.002 inches.

Another problem associated with commercial application of the copper material is that the sections of material are not flat prior to applying them to the hull of the vessel. This unevenness in the strip material is a result of residual rolling stresses remaining in the material after the last rolling operation. These internal stresses result in the strips of copper material exhibiting curving in both longitudinal and transverse directions. These curves cause difficulty in proper adhesion of the copper strip material to a hull. To solve this problem, applicant has discovered that stress relief annealing the copper strip material prior to applying it on a hull reduces the internal stresses in the material and produces a flatter product that has improved adhesion to the hull. This stress relief annealing step is conducted using parameters well known in the field of stress relief annealing of strip material and exact operating parameters are not considered an aspect of the present invention. Once the material has been stress relieved, it may be subjected to the above-described cleaning and/or abrading and priming steps prior to application onto the hull of a vessel.

In addition to providing a clean copper strip material surface, applications wherein a vessel hull has been in a marine environment may require a cleaning step prior to applying a copper strip material. This hull cleaning step may be performed using mechanical or chemical means. After the cleaning step, the hull surface should be protected to prevent oxidation or accumulation of dirt if the copper strip material is not to be applied within 20 minutes. The hull may be protected by applying a spray-on primer that is compatible with the dielectric barrier to be used to adhere the hull to the copper strip material or the dielectric barrier itself may be used as a primer.

In a further aspect of the invention, the method of installing the copper material to the hull of the vessel may include a zone alarm system which is designed to indicate when and where a galvanic couple may have been created between the copper material and hull. In the operation of boats, the hull may be subjected to various impacts that may dent or crease the outer copper material such that the dielectric barrier no longer separates the copper material from a dissimilar metal hull material. As such, utilizing the novel alarm system as described hereinafter will facilitate indicating to the boat operator that a galvanic couple has been established by impact between the hull and the copper strip material. FIG. 6 illustrates a typical schematic of a zone alarm system generally designated by reference numeral 70 and is seen to include a first leg of the electrical circuit 77 connected to copper strip material 71, a second leg of the electrical circuit 79 connected to the vessel hull 75, horn and light indicators 81 and 83 respectively connected in parallel to circuit leg 77, power source 85 connected between the horn and light indicator 81 and 83 and circuit leg 79. Vessel hull 75 is separated with a dielectric barrier 73 from copper material 71. In operation, the circuit remains open until impact on copper material 71 causes the copper material 71 to bend or dent such that vessel hull 75 is in contact with copper material 71. This contact results in electrical conduction thereby closing the circuit and actuating horn 81 and light 83 thereby indicating to the user of the vessel that a galvanic couple has been created and notifying the user to repair the damaged area of the hull. Although the illustrated alarm system depicts a light and horn in combination, either indicator may be utilized alone. Additionally, a plurality of these alarm systems may be used to create a zoned system such that the user of the vessel may identify more easily which area the hull has the galvanic coupling.

In another aspect of the invention, applicant has discovered that improved results occur in pleasure boat applications when the copper strip material has an outer surface finish of between about 15 to 25 microns. This surface finish assists in minimizing drag during vessel operation. When applying the copper strip material having the above-mentioned surface finish, it has been discovered that in areas of overlap the portion of the fine surface finished strip material that is to be overlapped by an adjacent strip requires an operation to roughen the portion of the surface to be overlapped to enhance the bonding between overlapping strips. This may be accomplished by a mechanical abrading step similar to the abrading step described hereinabove for bonding of the strip material to a vessel hull.

In another aspect of the invention, applicant has realized that a further reduction in galvanic corrosion may be achieved if all flush mounted underwater appendages of the vessel are approximately matched in composition to the composition of the copper strip material. Generally, these flush mounted appendages will be in direct contact with the copper strip material thereby necessitating a similarity in composition to reduce galvanic corrosion.

In a further aspect of the invention, an improved method is disclosed for applying the copper strip to the hull of a vessel without the necessity of mechanically or electrically sensing the profile of a hull and using the sensed profile to produce patterns of copper material. In this method, a simulative material in place of the copper strip material is utilized to determine the hull profile and produce the desired pattern for the copper strip material. This simulative material may be any material that has similar surface rigidity as well as thickness of the copper material to be applied. A preferred material would include a MYLAR type material. In this method, the measuring of the surface configuration of a hull is performed using the simulative material. In this measuring step, the simulative material is applied to the hull and is trimmed to produce patterns that accurately and completely cover the hull. Once the patterns are completed, the copper material may be cut using the patterns as a guide. After cutting, the copper strips may be applied as described hereinabove. The advantage this method offers includes eliminating the need of expensive equipment to perform the sensing step, reducing the amount of overlap, if any, which has significant economic advantages in large commercial applications and allowing the person performing the measuring step to custom design the patterns regarding which edges face aft, how edges are angled and how strakes and other appendages are covered.

Applicant has found that application of the foil to the boat hull in the improved manner described hereinabove results in the following advantages over that disclosed by the prior art:

1) Improved bonding between the copper material and hulls;

2) Improved economics by minimizing the amount of overlap during installation;

3) Less corrosion occurs between foil and hull;

4) More operator control during the installation process using the surface actuated adhesive.

5) Impact damage to the hull is readily detected.

Accordingly, an invention has been disclosed herein which overcomes each and every one of the deficiencies in the prior art as discussed hereinabove and which provides a new and improved method of installing a metallic foil on a vessel hull which is greatly reduced in cost and greatly increased in life. Various changes, modifications and alterations may be contemplated by those skilled in the art to the teachings of the present invention, and such modifications, changes and alterations are intended to be construed as being included in the teachings of the present invention. Accordingly, it is intended that the present invention only be limited by the terms of the appended claims.

I claim:

1. A method of protecting a hull of a marine vessel from fouling, including the steps of:
   (a) measuring the surface configuration and shape of the hull;
   (b) providing a predominantly copper foil material having a first and second surface;
   (c) stress relief annealing said foil material to relieve internal rolling stress and improve adherence of said foil material to said hull;
   (d) cutting a plurality of strips of said predominantly copper foil material which together, taking into account intended strip overlap, correspond to said surface configuration, said hull including at least one structure thereon made of a metal of dissimilar composition from the composition of said foil material;
   (e) applying said strips of foil material to said hull in adjacent relation, in any, while maintaining isolation of said foil material from said at least one structure by physically spacing said foil material from said at least one structure so that currents are not conducted therebetween;
   (f) smoothing said strips of foil material on said hull with a smoothing device; and
   (g) rolling a roller device over said strips of foil to adhere said strips of foil to said hull and to eliminate bubbles therefrom.

2. The method of claim 1, wherein said measuring step is accomplished by running a computer mouse over said hull at spaced intervals at an angle to the keel of said vessel and recording, in said computer, data indicative of said surface configuration and shape.

3. The method of claim 2, wherein said cutting step is carried out by inputting data into a computer controlled cutting machine from said first mentioned computer and said cutting machine cutting said strips.

4. The method of claim 1, wherein said foil material includes about 15% nickel.

5. The method of claim 1, before said applying step, further including the step of cleaning at least said first surface of said foil material to remove oxidation products thereon and to improve adherence of said first surface of said foil material to said hull.

6. The method of claim 5, wherein said cleaning step comprises mechanically abrading said first surface.

7. The method of claim 5, wherein said cleaning step comprises subjecting said foil material to an acid bath to remove said oxidation products.

8. The method of claim 6, wherein said mechanical abrading introduces a surface finish on said first surface of about 20 to 400 grit.

9. The method of claim 6, including mechanically abrading said first surface to produce a surface finish of about 80 to 200 grit.

10. The method of claim 1, before said applying step, further including the step of priming said first surface using a primer material compatible with said foil material to protect said foil material from oxidation.

11. The method of claim 10, wherein said applying step includes the step of interposing a dielectric barrier between said first surface of said foil material and said hull, said dielectric barrier comprising an adhesive with dielectric properties which adheres said foil material to said hull.

12. The method of claim 11, wherein said primer material comprises said dielectric barrier.

13. The method of claim 11, wherein said applying step includes the step of applying said dielectric barrier on all seams of adjacent strips of said foil material.

14. The method of claim 6, further including the step of mechanically abrading a portion of a second surface of a respective said strip of said foil material that is to be overlapped by a portion of a first surface of an adjacent said strip of said foil material.

15. A method of protecting a hull of a marine vessel from fouling, including the steps of:

(a) measuring the surface configuration and shape of the hull;

(b) providing a predominantly copper foil material having a first and second surface;

(c) cleaning said first surface of said foil material to remove oxidation products and improve adherence of said first surface of said foil material to said hull;

(d) cutting a plurality of strips of said predominantly copper foil material which together, taking into account intended strip overlap, if any, correspond to said surface configuration, said hull including at least one structure thereon made of a metal of dissimilar composition from the composition of said foil material;

(e) applying said strips of foil material to said hull in adjacent relation, if any, while maintaining isolation of said foil material from said at least one structure by physically spacing said foil material from said at least one structure so that currents are not conducted therebetween;

(f) smoothing said strips of foil material on said hull with a smoothing device; and (g) rolling a roller device over said strips of foil to adhere said strips of foil to said hull and to eliminate bubbles therefrom.

16. The method of claim 15, wherein said cleaning step comprises mechanically abrading said first surface.

17. The method of claim 16, wherein said cleaning step comprises subjecting said foil material to an acid bath to remove said oxidation products.

18. The method of claim 16, wherein said mechanical abrading produces a surface finish on said first surface of about 20 to 400 grit.

19. The method of claim 16, including mechanically abrading said first surface to produce a surface finish of about 80 to 200 grit.

20. The method of claim 15 before said applying step, further including the step of priming said first surface after said cleaning step using a primer material compatible with said foil material to protect said foil material from oxidation.

21. The method of claim 20, wherein said applying step includes the step of interposing a dielectric barrier between said first surface of said foil material and said hull, said dielectric barrier comprising adhesive with dielectric properties which adheres said foil material to said hull.

22. The method of claim 21, wherein said primer material comprises said dielectric barrier.

23. The method of claim 21, wherein said applying step includes applying said dielectric barrier to all seams of adjacent said strips of foil material.

24. The method of claim 16, further including the step of mechanically abrading a portion of a second surface of a respective said strip of said foil material that is to be overlapped by a portion of a first surface of an adjacent said strip of said foil material.

* * * * *